United States Patent [19]
Menich et al.

[11] Patent Number: 5,313,489
[45] Date of Patent: May 17, 1994

[54] SIGNAL PROCESSING IN COMMUNICATION SYSTEMS

[75] Inventors: Barry J. Menich, Schaumburg; Michael D. Kotzin, Buffalo Grove, both of Ill.

[73] Assignee: Motorola, Inc., Schaumburg, Ill.

[21] Appl. No.: 83,118

[22] Filed: Jun. 25, 1993

[51] Int. Cl.[5] .............................................. H04K 1/00
[52] U.S. Cl. ......................................................... 375/1
[58] Field of Search ............................................. 375/1

[56] References Cited

U.S. PATENT DOCUMENTS

| | | | |
|---|---|---|---|
| 4,222,115 | 9/1980 | Cooper et al. | 375/1 |
| 5,056,109 | 10/1991 | Gilhousen et al. | 375/1 |
| 5,093,840 | 3/1992 | Schilling | 375/1 |
| 5,164,958 | 11/1992 | Omura | 375/1 |
| 5,179,571 | 1/1993 | Schilling | 375/1 |
| 5,216,692 | 6/1993 | Ling | 375/1 |

*Primary Examiner*—David C. Cain
*Attorney, Agent, or Firm*—Richard A. Sonnentag

[57] ABSTRACT

An AMPS system facilitates reception and processing of a DS CDMA signal transmitted by a mobile station (125). The AMPS system provides an alternate path for the signal to be received by a DS CDMA receiver (506) system. The DS CDMA receiver system generates a signal compatible with the AMPS system, adjusts the generated signal to be proportional to the DS CDMA signal, and inputs the adjusted signal (510) into the AMPS system. The AMPS system then processes the adjusted signal for purposes of handoff of the mobile station (125) from the DS CDMA system to the AMPS system.

16 Claims, 5 Drawing Sheets

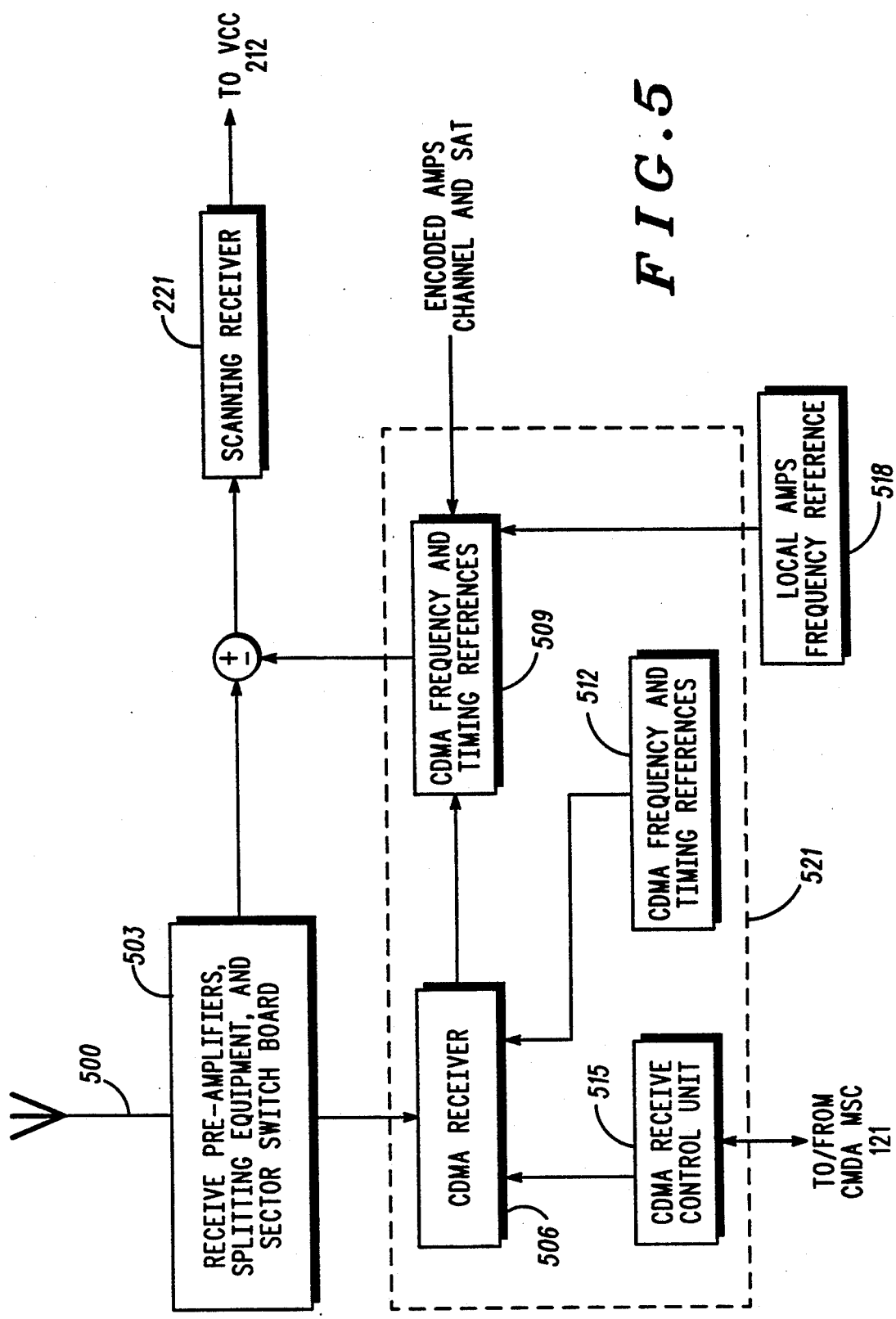

SIGNAL PROCESSING IN COMMUNICATION SYSTEMS

RELATED INVENTION

Reference is made to U.S. patent application Ser. No. 08/083,699, "Transmission and Reception of Signals in Communication Systems" in behalf of Kotzin et al., filed on Jun. 25th, 1993, containing related subject matter and assigned to the assignee of the present invention.

FIELD OF THE INVENTION

The present invention relates generally to dual-mode communication systems which employ spread-spectrum signals and frequency modulated signals (FM) and, more particularly, to handoff of a mobile from the spread-spectrum signalling portion of the system to the FM signalling portion of the system.

BACKGROUND OF THE INVENTION

Communication systems designed to incorporate the characteristic of communicating with many remote mobile stations for brief intervals and occupying common radio spectrum resources are termed multiple access communication systems. One type of communication system which can be a multiple access system is a spread spectrum system. In a spread spectrum system, a modulation technique is utilized in which a transmitted signal is spread over a wide frequency band within the communication channel. The frequency band is much wider than the minimum bandwidth required to transmit the information being sent. A voice signal, for example, can be sent with amplitude modulation (AM) in a bandwidth only twice that of the information itself. Other forms of modulation, such as low deviation frequency modulation (FM) or single sideband AM, also permit information to be transmitted in a bandwidth comparable to the bandwidth of the information itself. However, in a spread spectrum system, the modulation of a signal to be transmitted often includes taking a baseband signal (e.g., a voice channel) with a bandwidth of only a few kilohertz, and distributing the signal to be transmitted over a frequency band that may be many megahertz wide. This is accomplished by modulating the signal to be transmitted with the information to be sent and with a wideband encoding signal.

Information (i.e. a message signal) can be embedded in the spread spectrum signal by several methods. One method is to add the information to the spreading code before it is used for spreading modulation. This technique can be used in direct sequence and frequency hopping systems. It will be noted that the information being sent must be in a digital form prior to adding it to the spreading code, because the combination of the spreading code and the information, typically a binary code, involves modulo-2 addition. Alternatively, the information or message signal may be used to modulate a carrier before spreading it.

Thus, a spread spectrum system must have two properties: (1) the transmitted bandwidth should be much greater than the bandwidth or rate of the information being sent and (2) some function other than the information being sent is employed to determine the resulting modulated channel bandwidth.

A specific type of spread spectrum communication technique known as direct sequence works by modulating a carrier with a digital code sequence whose bit rate is much higher than the information signal bandwidth.

Multiple communication channels are allocated by using a plurality of spreading codes within a portion of radio spectrum, each code being uniquely assigned to a mobile station. The unique spreading codes are preferably orthogonal to one another such that the cross-correlation between the spreading codes is approximately zero. Particular transmitted signals can be retrieved from the communication channel by de-spreading a signal representative of the sum of signals in the communication channel with a spreading code related to the particular transmitted signal which is to be retrieved from the communication channel. Further, when the spreading codes are orthogonal to one another, the received signal can be correlated with a particular spreading code such that only the desired signal related to the particular spreading code is retrieved.

Handoff of the spread spectrum mobile between cell-sites in a spread spectrum system is accomplished by using the Mobile Assisted Handoff (MAHO) functions of the mobile stations. Typically, the spread spectrum mobile station makes measurements on pilot channels belonging to each cell-site. Pilot channels are unique codes in the spread spectrum system that the mobile station knows of a priori. The measurement of any one pilot channel is composed of a strength indication and a phase measurement of the pilot relative to a time standard used by the spread spectrum system. The list of pilot channels for the mobile station to use in determining handoff suitability is communicated to the mobile station at call setup time or via a special message during traffic channel operations. When the mobile station observes that the measured strength of a particular pilot channel exceeds a predetermined threshold, the mobile station shall signal the base station with this information in a request for handoff. Handoff is then enacted at the discretion of the base station equipment.

A special form of handoff known as "soft handoff" is possible in the direct sequence spread spectrum system. This is due to the fact that all communications between mobile stations and base stations take place on the same frequency/communications channel. Soft handoff allows the mobile station to communicate with several base stations simultaneously, thus enhancing reception by both the base station equipment and mobile stations.

Narrowband frequency modulation (FM) systems impart intelligence to a carrier by varying the frequency of the carrier within a predetermined range (maximum deviation). Such systems are known, and one such example applied to cellular communications is the Advanced Mobile Phone Service (AMPS) cellular system specified by the Electronic Industries Association. Because narrowband systems like AMPS do not support MAHO, handoff of a mobile station from one cell-site to another cell-site requires the intervention of the cellular system. The Mobile Switching Center (MSC) in a narrowband system determines possible target candidates for a call requiring handoff. Specifically, a scanning, or locating, receiver may be used at the current serving cell-site to detect the need for handoff (based on low received signal strength) and at the target candidate cell-site (by command of the MSC) to determine the suitability of that cell to support the call. While many handoff algorithms could, and do, exist, a handoff is typically enacted when one cell-site perceives the mobile station's signal strength to be stronger than the current serving cell-site.

As spread spectrum technology becomes incorporated into next generation cellular systems, practical system complications due to the nature of cellular systems arise. For example, in cellular systems incorporating both spread spectrum and narrowband FM channels it may become necessary to enact handoff between both sets of channels when conditions warrant. Such a handoff could only take place for mobile stations that are dual mode in nature such that they support both spread spectrum and narrowband signalling. While a mobile station is communicating with the cellular system on a spread spectrum channel, it is not possible for the narrowband portion of the system to determine handoff suitability of the mobile station as the transmissions are spread over a bandwidth larger than the narrowband channel. In addition, the FM portion of the cellular system does not support spread spectrum pilot channels. Systems may be constructed such that the spread spectrum portion of the system and the narrowband portion of the system are non-overlapping. Thus, a cellular system employing both spread spectrum coverage and narrowband coverage would need to enact handoff to preserve the continuity of a call as a mobile station moves from the area of the former to that of the latter. This is possible as mobile stations designed for the cellular system are dual-mode and are capable of generating, and interpreting, both spread spectrum and narrowband signalling. Prior art solutions to handoff from the spread spectrum portion of the system to the narrowband portion of the system assumed overlap of RF coverage between the portions. Thus, there existed no direct way to guarantee that the mobile station would experience adequate RF coverage upon completion of the handoff in a non-overlapping system.

Thus a need exists for a mechanism by which handoff may take place from the spread spectrum portion of a cellular system to the narrowband portion without increasing the equipment cost of the narrowband equipment suite while guaranteeing that a mobile station has adequate RF coverage within the narrowband portion of the cellular system upon completion of the handoff process.

BRIEF DESCRIPTION OF THE DRAWINGS

FIG. 5 depicts an alternate path for DS CDMA signals at an AMPS cell-site in accordance with the invention.

DETAILED DESCRIPTION OF A PREFERRED EMBODIMENT

Figure 1:
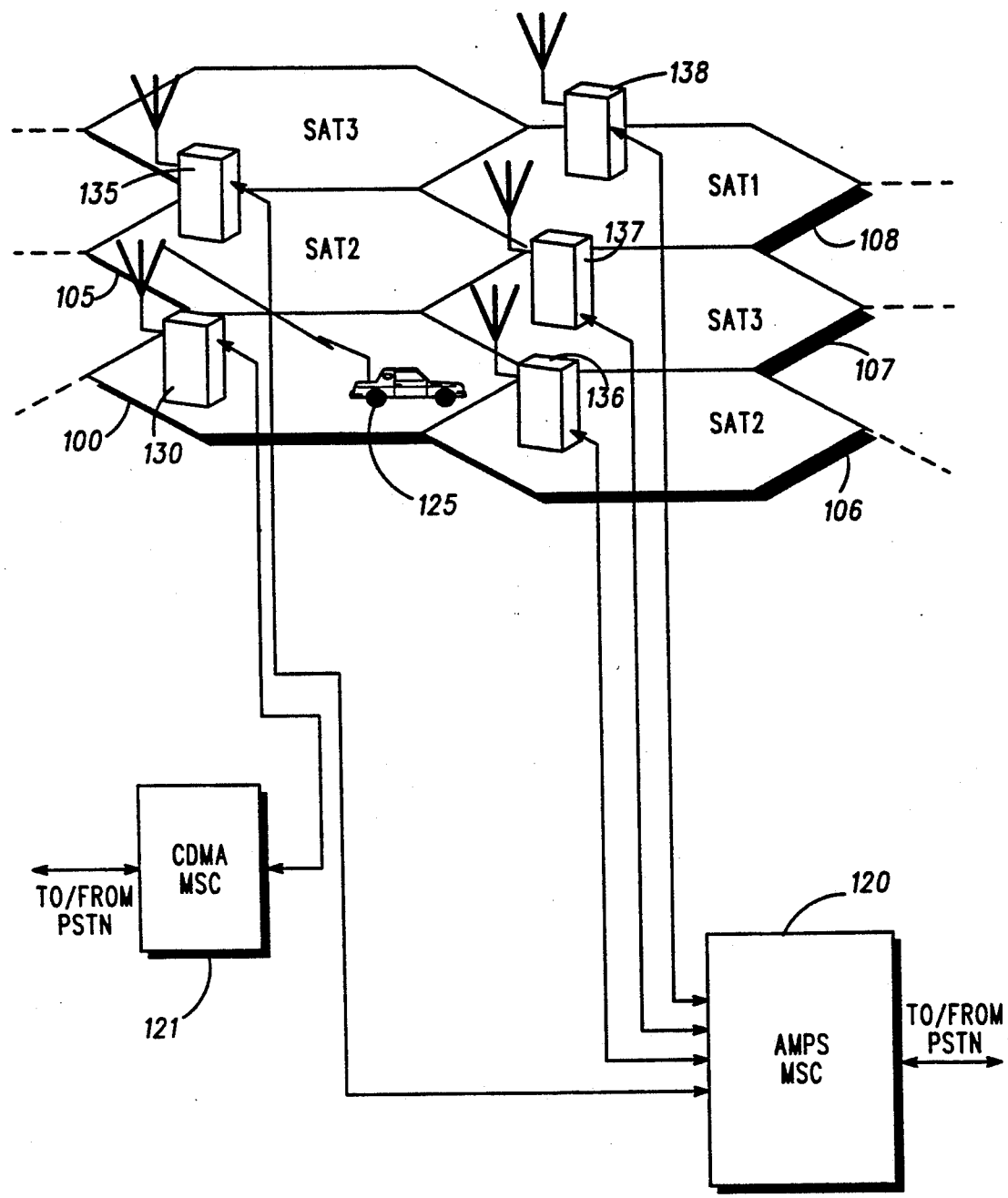
FIG. 1 generally depicts a DS CDMA base-station and AMPS base-stations coupled to respective MSCs in a communication system that may be used to beneficially employ the present invention.

Referring to FIG. 1, a cellular system comprising a first communication system, (a spread spectrum system) designated by base-station 130 in cell 100 and a surrounding second communication system (an analog system) designated by base-stations 135-138 in cells 105-108 is shown. In the preferred embodiment, the spread spectrum system is a direct sequence code-division multiple access (DS CDMA) communication system while the analog system is the Advanced Mobile Phone System (AMPS). An example of a DS CDMA system is described in U.S. Pat. No. 5,103,459 for Gilhousen et al. filed Jun. 25, 1990, and is incorporated herein by reference. The system forward channels consist of traffic bearing channels, channels for paging and communication of system overhead information, a synchronization channel, and a pilot channel that is used for handoff purposes and phase tracking by the mobile station receiver system. As shown in FIG. 1, a mobile station 125 is engaged in an active call with the DS CDMA system. The DS CDMA system is depicted only as a single cell 100 for convenience; in reality the DS CDMA may be comprised of many cells. When surrounded by DS CDMA cells, mobile station 125 would make measurements on pilot signals emanating from base-stations of those surrounding DS CDMA system cells to determine if handoff is required within the DS CDMA system.

In the scenario depicted in FIG. 1, a DS CDMA system is surrounded by AMPS. When mobile station 125 moves beyond the boundary of DS CDMA cell 100 into an AMPS cell, for example cell 106, DS CDMA base-station 130 detects the need for handoff by employing the results of the pilot measurements supplied by mobile station 125. Based upon the measurements supplied by mobile station 125, the DS CDMA base-station 130 determines that the mobile station 125 has moved beyond the DS CDMA coverage area and that handoff is desirable to an AMPS base-station, for example AMPS base-station 136.

Figure 2:
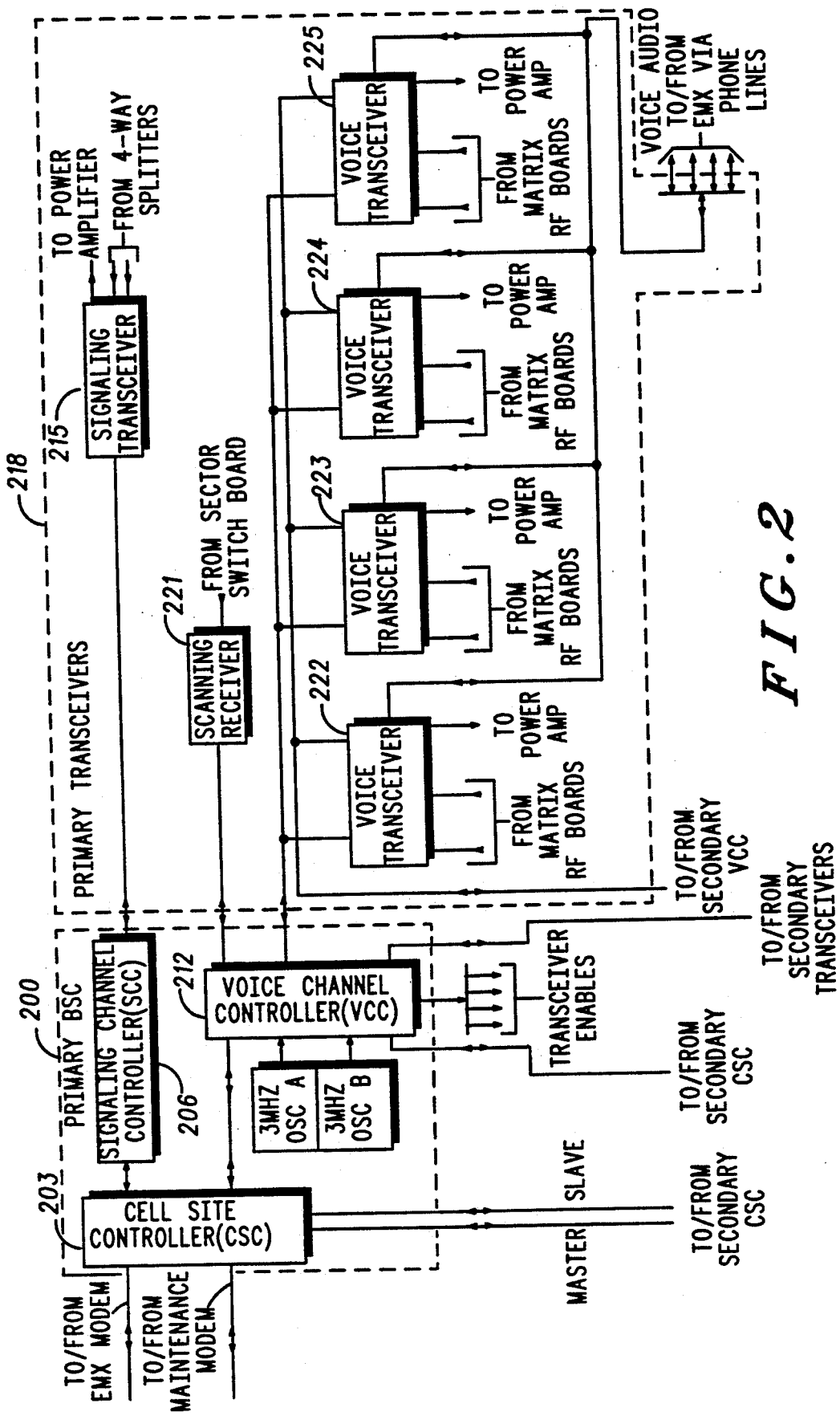
FIG. 2 generally depicts in block form a base-station controller (BSC) and transceivers located within the AMPS base-stations of FIG. 1.

Each AMPS base-station 135-138 includes a plurality of transmitters and receivers for operating on at least one duplex signalling channel and a plurality of voice channels. One conventional system employs transmitters and receivers of the type described in Motorola Instruction Manual No. 68P81058E05-A published by Motorola Service Publications, Schaumburg, Ill., in 1989. FIG. 2 generally depicts transceivers and associated controlling hardware found within an AMPS base-station 135-138. A base-site controller (BSC) 200 typically consists of four circuit cards and provides the interface between AMPS base-stations 135-138 and AMPS MSC 120. A base-station controller (BSC) 200 is comprised of a cell-site controller (CSC) 203, a voice channel controller (VCC) 212, a signalling channel controller (SCC) 206, and an extend multiple port interface (EMPI) (not shown). An identical secondary set of cards can be employed to provide BSC redundancy. Together, these cards provide voice channel assignment, signalling channel control, performance monitoring, and other control functions that are used by AMPS MSC 120 to initiate calls, determine channel allocation, and make handoff decisions.

Figure 3:
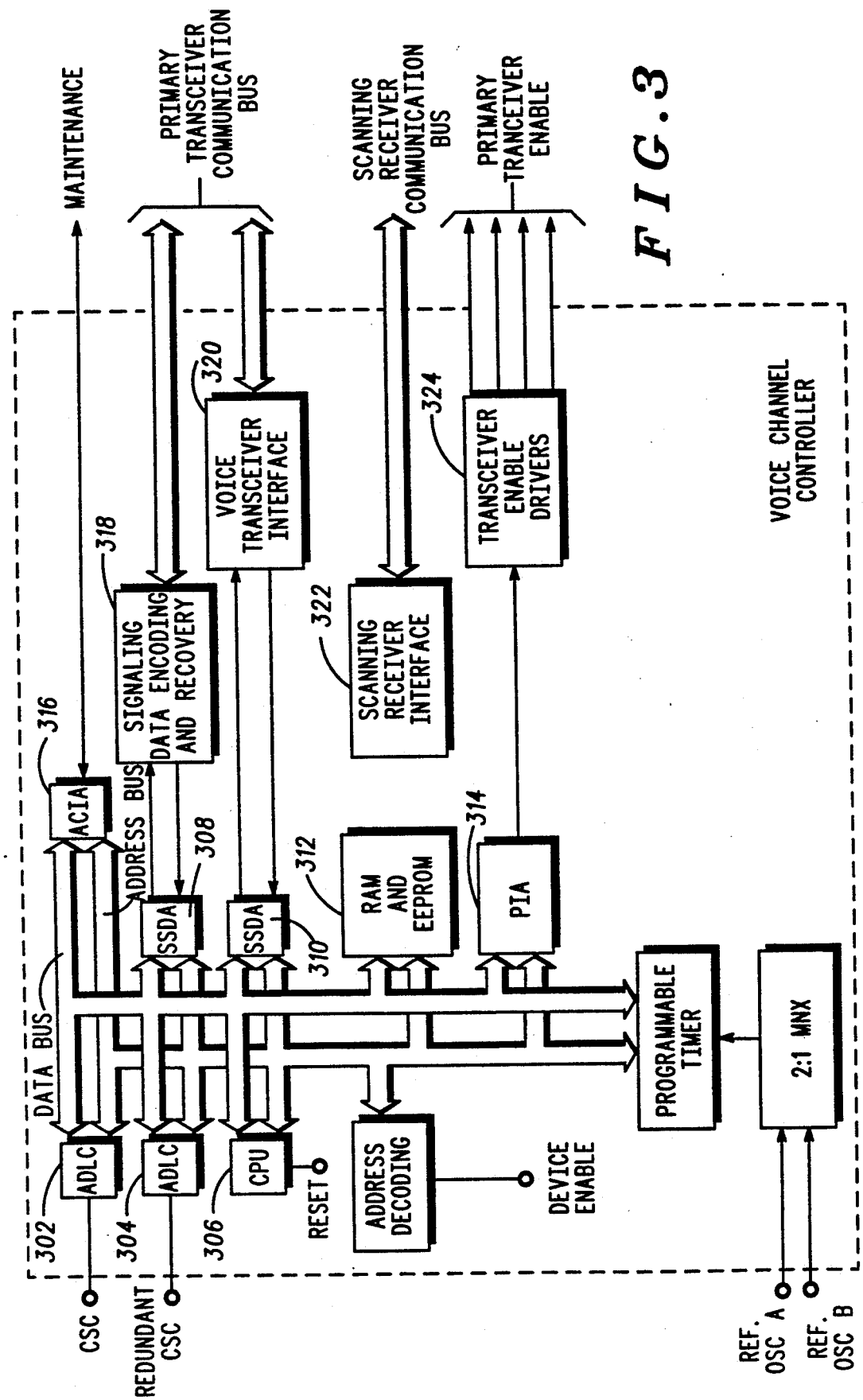
FIG. 3 illustrates a voice channel controller (VCC) located within the BSC of FIG. 2 and used to control the scanning and voice transceivers found in FIG. 2.

VCC 212 controls the primary voice transceivers 222-225 and the scanning receiver 221. FIG. 3 generally depicts a block diagram of a VCC 212 which may be employed to implement the present invention. The central processing unit (CPU 306) may be a microprocessor such as MC6809 available from Motorola, Inc. This CPU 306 is is used to control the primary voice channel transceivers 222-225 and scanning receiver(s) 221 in accordance with programmed steps stored in RAM and EPROM 312. In a non-redundant configuration of the present invention, VCC 212 may control up to 30 channels of radio equipment and one scanning receiver employing SSDA 310, voice transceiver interface 320, and scanning receiver interface 322. Signalling data encoding and decoding is controlled via SSDA 308 and signalling encoding and recovery interface 318. Transceivers are selected by enable drivers 324 which is controlled by CPU 306 via peripheral interface adapters (PIA) 314. In the redundant configuration requiring two VCCs, each transceiver (being dual ported) can communicate with both VCCs. Under normal operating conditions, each VCC actively controls half of the channels while exchanging control and status messages with the other half. Interface to a redundant CSC is accomplished via ADLC 304.

Figure 4:
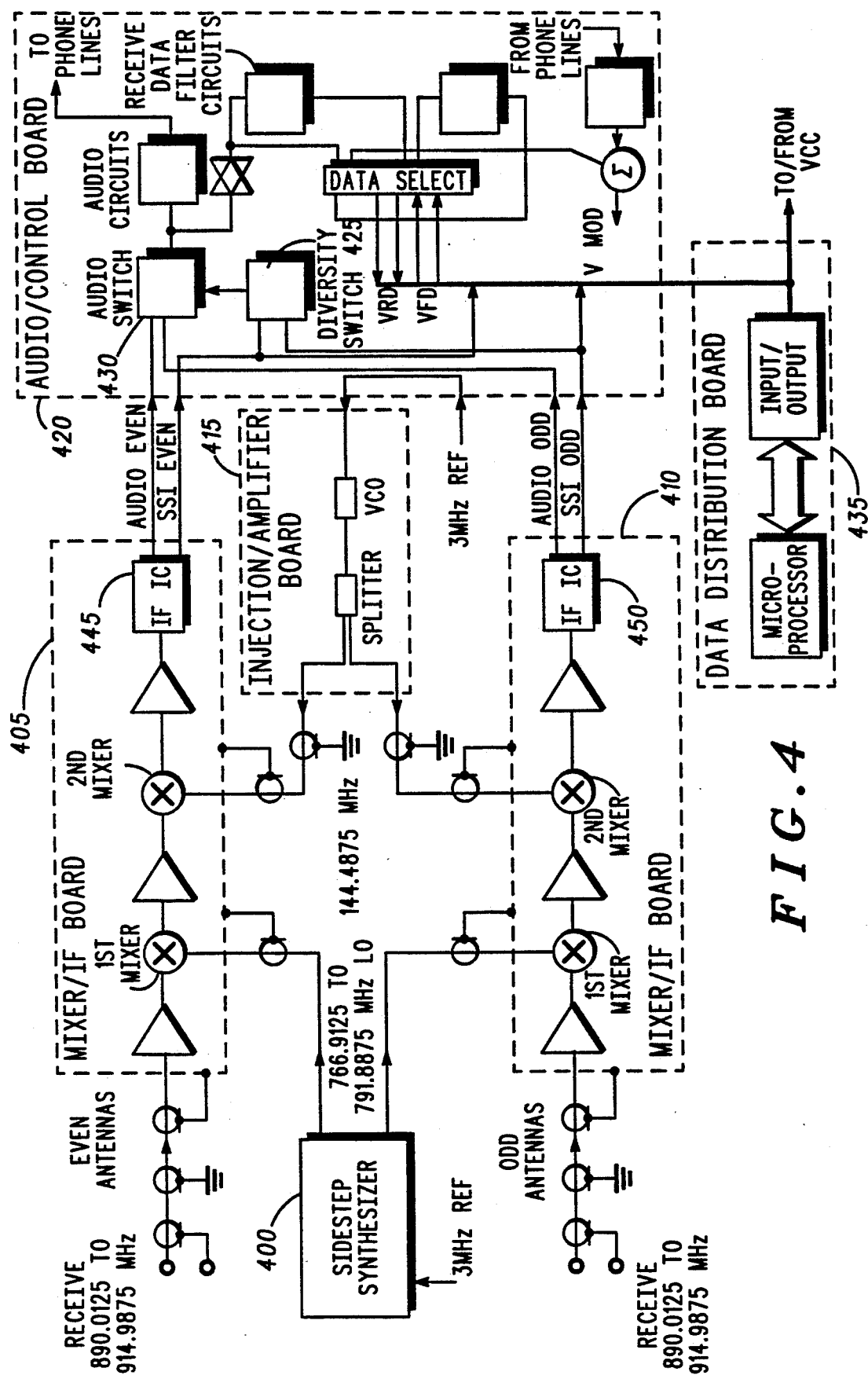
FIG. 4 generally depicts a schematic diagram of a receiver employed to receive and process a narrowband signal in accordance with the invention.

In the AMPS system, a transmitted narrowband signal from a mobile station 125 enters one of voice transceivers 222-225 via a matrix RF board (not shown) or enters a scanning receiver 221 via a sector switch board (not shown). FIG. 4 generally depicts a schematic diagram of receiver hardware employed to demodulate the transmitted narrowband signal and determine a signal quality value or signal strength indication (SSI) of the signal. Referring to FIG. 4, the receiver has as input an even and odd signal for diversity reception purposes. An even mixer/IF board 405 accepts the even signal while an odd mixer/IF board 410 accepts the odd signal. Both mixer/IF boards 405, 410 have an input from a sidestep synthesizer 400 which acts as a first local oscillator (LO) for mixing purposes. An injection/amplifier board 415 provides another input to each mixer/IF board 405, 410 and acts as a second LO for mixing purposes. The IF ICs 445, 450, which in the preferred embodiment are part number TDA 1576 available from Signetics, provide limiting, quadrature detection, and amplification to yield an audio output signal which is further amplified and fed to a audio control board 420 for processing the narrowband signal. SSI detection is performed by circuitry internal to the IF ICs 445, 450 and by discrete SSI detection range extension circuitry. The outputs of IF ICs 445, 450 individually provide linear SSI signals. These SSI signals are fed to the audio control board 420 where they are used to drive a diversity switch 425, which in turn is used to enable/disable an audio switch 430. Output from the audio switch 430 is the audio which represents the communication from the subscriber 125. This audio is output to AMPS MSC 120 via conventional phone lines.

In AMPS cells 105-108, a scanning receiver 221 located within AMPS base-stations 135-138 receive signals via antennas and front-end equipment, for example antenna 500 and front-end equipment 503 of FIG. 5. A scanning receiver 221 within an AMPS base-station 135-138 makes measurements on mobile stations, such as mobile station 125, which are potential candidates for handoff, and report these measurement results to the next highest device in the AMPS cell-site control hierarchy, which in the preferred embodiment is AMPS MSC 120.

FIG. 5 also depicts an alternate path for DS CDMA signals at an AMPS cell-site 105-108 in accordance with the invention. The alternate path enters equipment 521 which processes signals for mobile stations communicating on DS CDMA voice/data traffic channels. Equipment 521 includes, inter alia, a DS CDMA receiver with the capability to lock onto and measure the signal strength of the DS CDMA signal corresponding to a particular DS CDMA communication on a voice/data traffic channel. If mobile station 125 is communicating to DS CDMA base-station 130, and requires a handoff from the DS CDMA system to AMPS, equipment 521 located at an AMPS cell-site 105-108 is utilized to measure the DS CDMA signal transmitted by mobile station 125 for purposes of handoff from the DS CDMA system to AMPS.

Equipment 521 also includes a CDMA receive control unit 515 which is responsible for controlling CDMA receiver 506. Information related to CDMA communications requiring handoff are transferred from CDMA MSC 121 to CDMA receive control unit 515. This information specifically relates to the uplink (transmission of mobile station 125) modulation for the specific communication in question and includes the User Long Code, Walsh assignment, current output power of mobile station 125, and pseudo-random noise (PN) phase alignment offset relative to CDMA base-station 130. With this information, CDMA receiver 506 then utilizes well-known adaptive phase locking techniques (CDMA receiver 506 having been previously synchronized to the DS CDMA system at initialization) to lock onto and measure (or detect) a signal level for the communication in question. This signal level is quantized, coded, and passed to AMPS transmitter 509. Also input to AMPS transmitter 509 is information regarding an encoded AMPS channel and SAT which is used to generate a signal compatible with AMPS. AMPS transmitter 509 also adjusts the level of the generated signal to be substantially proportional to the signal detected by CDMA receiver 506. Note that the output power range of the AMPS transmitter 509 need not be equal to the dynamic range of the input DS CDMA signal since the power range of interest is limited to the power range of scanning receiver 221. The output of AMPS transmitter 509 is an adjusted generated signal 510 which is input into scanning receiver 221 for processing related to functions of AMPS.

Important to note is the timing for the handoff measurement request process. CDMA receive control unit 515 must generate the AMPS channel with SAT and hold that signal for the duration of time it takes scanning receiver 221 to make the required measurement. This hold time may vary between infrastructure suppliers of AMPS base-stations 135-138 and may be controlled via parameterization input to the CDMA receiver 506. Equipment 521 would be required to manage the AMPS channel/SAT generation combinations in use by any of CDMA receivers to avoid problems in discriminating one CDMA communication from another. Also important to note is that the AMPS transmitter 509 can be used to generate several different AMPS frequencies with different SAT assignments simultaneously. This is necessary in the case where multiple handoffs into the AMPS cell occur simultaneously.

While the invention has been particularly shown and described with reference to a particular embodiment, it will be understood by those skilled in the art that various changes in form and details may be made therein without departing from the spirit and scope of the invention.

What we claim is:

1. A method of signal processing comprising the steps of:
    detecting, in a first communication system, a level of a signal transmitted by a mobile station;
    generating a signal compatible with a second communication system;

adjusting the level of the generated signal compatible with a second communication system to be substantially proportional to the detected level of the signal transmitted by the mobile station in the first communication system; and inputting the adjusted generated signal into the second communication system for processing related to functions of the second communication system.

2. The method of claim 1 wherein the first communication system further comprises a code division multiple access (CDMA) communication system.

3. The method of claim 1 wherein the second communication system further comprises an analog cellular radiotelephone system.

4. The method of claim 1 wherein the step of inputting the adjusted signal into the second communication system for processing related to functions of the second communication system further comprises the step of inputting the adjusted signal into the second communication system for processing related to handoff functions of the second communication system.

5. A method of facilitating handoff between unlike communication systems, the method comprising the steps of:

detecting, in a receiver of a first communication system, a level of a signal transmitted by a mobile station communicating within the first communication system;

generating a transmission signal compatible with a second communication system;

adjusting the level of the transmission signal compatible with a second communication system to be substantially proportional to the detected level of the signal transmitted by the mobile station communicating with the first communication system; and inputting the adjusted generated signal into a receiver of the second communication system for processing related to handoff functions.

6. The method of claim 5 wherein the first communication system further comprises a code division multiple access (CDMA) communication system.

7. The method of claim 5 wherein the second communication system further comprises an analog cellular radiotelephone system.

8. An apparatus for facilitating handoff between unlike communication systems, the apparatus comprising:

means for detecting a level a signal transmitted by a mobile station within a first communication system;

means for generating a signal compatible with a second communication system;

means for adjusting the generated signal compatible with the second system to be substantially proportional to the detected level of the signal transmitted by a mobile station with the first communication system; and means for transmitting the adjusted generated signal compatible with the second system to the second communication system for processing related to handoff functions.

9. The apparatus of claim 8 wherein said first communication system further comprises a code division multiple access (CDMA) communication system.

10. The apparatus of claim 9 wherein said means for detecting further comprises a CDMA communication system receiver.

11. The apparatus of claim 8 wherein said second communication system further comprises an analog cellular radiotelephone system.

12. The apparatus of claim 11 wherein said means for generating a signal compatible with a second communication system further comprises means for generating a frequency modulated (FM) signal having a supervisory audio tone (SAT) modulated thereon.

13. An apparatus for enabling measurement of a mobile station communicating in a code division multiple access (CDMA) communication system at a target analog radiotelephone system, said apparatus comprising:

a CDMA receiver for detecting the signal strength of a signal transmitted by the mobile station;

means for generating a signal compatible with the analog radiotelephone system;

means for adjusting a signal strength of the generated signal compatible with the analog radiotelephone system to be substantially proportional to the signal strength of the signal transmitted by the mobile station; and means for inputting said adjusted generated signal into a receiver of the analog radiotelephone system.

14. The apparatus of claim 13 wherein said means for generating a signal compatible with a second communication system further comprises means for generating a frequency modulated (FM) signal having a supervisory audio tone (SAT) modulated thereon.

15. The method of claim 1 wherein the first communication system further comprises a time division multiple access (TDMA) communication system.

16. The method of claim 5 wherein the first communication system further comprises a time division multiple access (TDMA) communication system.

* * * * *